UNITED STATES PATENT OFFICE.

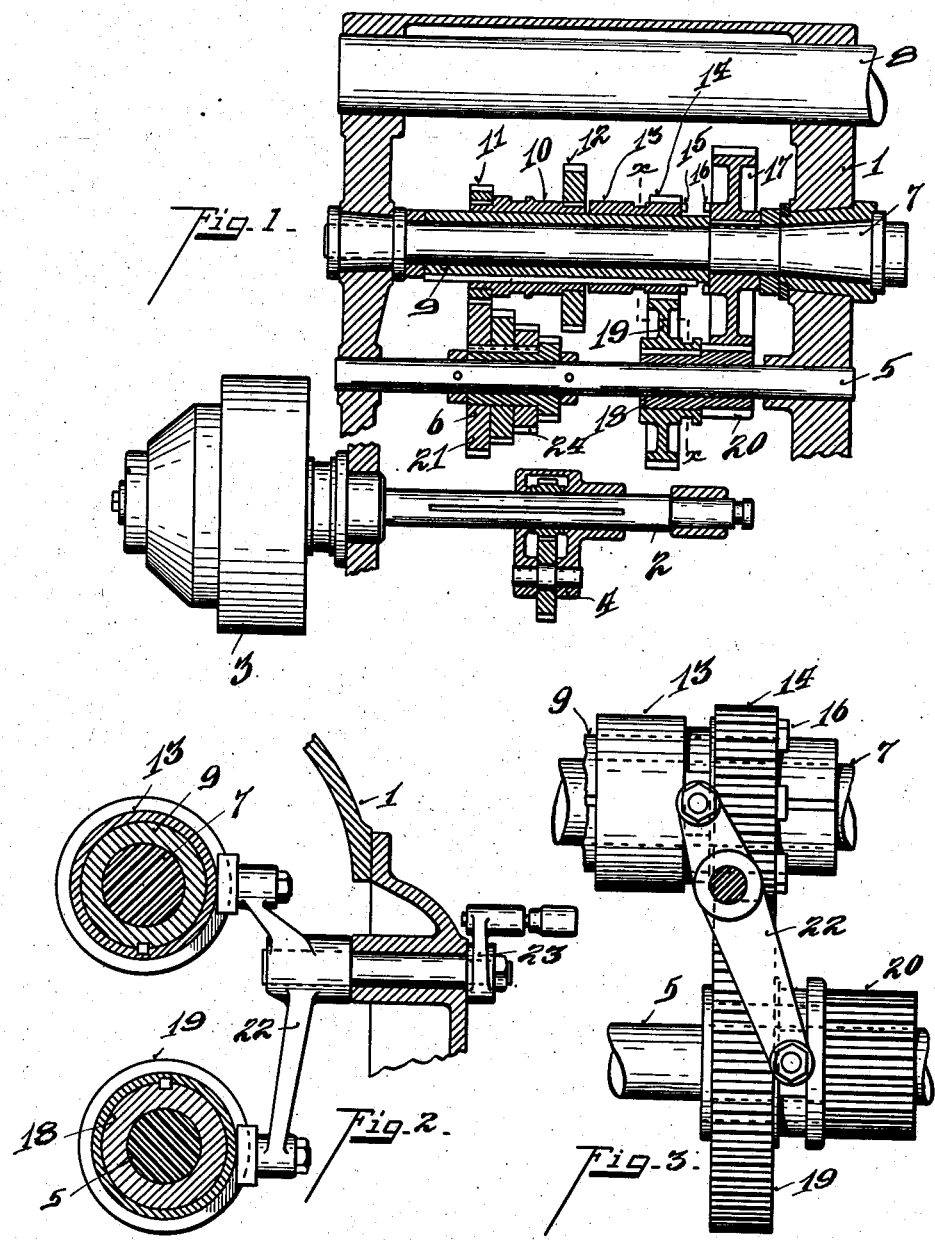

ADOLPH L. DE LEEUW, OF HAMILTON, OHIO, ASSIGNOR TO THE CINCINNATI MILLING MACHINE COMPANY, OF CINCINNATI, OHIO, A CORPORATION.

VARIABLE-SPEED MECHANISM.

No. 911,951.  Specification of Letters Patent.  Patented Feb. 9, 1909.

Application filed October 7, 1907. Serial No. 396,239.

*To all whom it may concern:*

Be it known that I, ADOLPH L. DE LEEUW, a citizen of the United States, residing at Hamilton, in the county of Butler and State of Ohio, have invented certain new and useful Improvements in Variable-Speed Mechanism, of which the following is a specification.

My invention relates to a variable speed device, primarily designed to form the main drive of a milling machine, but applicable in its principles to the various uses of devices of this character.

The object of the invention is to provide a variable speed device which will act as a compounder for a primary speed device of the cone and tumbler type, and preferably disposed between the cone and tumbler system and the spindle. As this compounder is therefore disposed in the main frame of the machine in a position where there is but little available space, one of the features of importance is to get as many speeds as possible in a space as compact as possible, with the fewest possible parts, and of such strength and simplicity as will stand the heavy strains of machine tool work, and also be cheap in construction. To this end I interpose between the cone shaft and spindle, gearing and clutch mechanism adapted to be alternately engaged with two different members of the cone, whereby two direct and two back gearing drives may be taken from the cone to the spindle, so that my compounder aggregates four times the speeds of the cone.

The features of my invention will be more fully set forth in the description of the accompanying drawings forming a part of this specification, in which:—

Figure 1 is a central vertical section through my device. Fig. 2 is a section on line *x, x*, Fig. 1. Fig. 3 is a front elevation of the device for simultaneously shifting the gear and clutch.

1 represents the frame.

2 represents the tumbler shaft on the end of which is the primary driving device 3.

4 represents the usual tumbling gear construction on shaft 2 within the frame.

5 represents the cone shaft carrying the usual cone 6 showing four steps adapted to be selectively engaged by the tumbler 4.

7 represents the spindle, and 8 represents the overhanging arm.

9 represents a sleeve loose on the spindle 7.

10 represents a sleeve adapted to turn with and slide on sleeve 9.

11, 12, represent gears fixed to sleeve 10.

13 represents a second sleeve adapted to turn with and slide on sleeve 9.

14 represents a gear fixed to sleeve 13 and having a clutch face 15 adapted to engage with its coöperating clutch face 16 formed on gear 17, which latter gear is fixed directly to the spindle.

18 represents a sleeve loose on the cone shaft 5 and carrying the gears 19, 20.

When the parts are in the position shown in Fig. 1, gear 11 is intermeshed with cone gear 21, driving sleeves 9, 10 and 13, and through gears 14, 19, 20 and 17 driving the spindle 7, this being what I call a back gear drive. The sleeves 13 and 18 are connected by a yoke lever 22, operated by a rock shaft and crank 23, to simultaneously shift the sleeves in opposite directions. When this crank 23 is operated to shift these sleeves to the reverse of the position shown in Fig. 1, the gears 14 and 17 will be disengaged from gears 19, 20, and the sleeve 13 will be clutched directly to the gear 17, thus constituting what I call a direct drive from the cone to the spindle. It will also be noted that the arm of lever 22 operating gears 19 and 20 is greater in length than the arm operating the sleeve 13, the function of which is that the gear 20 moves out of mesh with gear 17 before the clutch teeth 15 are engaged with the clutch teeth 16 and vice versa. This is necessary to avoid damage to the parts. The sleeve 10 may be shifted to the left, disengaging gears 11 and 21, and engaging gear 12 with the gear 24 of the cone, and in this position the lever 23 may be again operated to transmit a direct and a back-gear drive from the cone to the spindle. These compounding operations are effected by the manipulation of two levers.

It is to be understood that where the motion is transmitted from the cone to a gear on the driven shaft or spindle, and this gear is clutched or fixed to the driven shaft or spindle for convenience of differentiation, I term this a "direct drive"; and where the motion from the cone is transmitted to a loose gear on the driven shaft or spindle and thence back to a loose gear on the cone shaft, and then to a gear clutched or fixed to this driven shaft or spindle, the ultimate result is a compound speed effect which I term "back gearing".

With my invention this combination of direct and back gearing drive is obtainable by the employment of two shafts, the cone and driven shafts, and the clutch and gearing mechanism mounted thereon.

Having described my invention, I claim—

1. In a variable speed device, a cone and tumbler gear system, loose gears on the cone shaft, and a driven shaft, two independently sliding gears loose on the driven shaft but in driving connection with each other, means for connecting said sliding gears to the driven shaft, and means for throwing the loose gears into the train when the sliding gear is disconnected from the driven shaft, substantially as described.

2. In a variable speed device, a cone and tumbler gear system and a driven shaft, gear, clutch and shifting mechanism disposed on the cone and driven shafts, whereby a direct and back gear drive may be taken for each step of the cone, substantially as described.

3. In a variable speed device, a cone and tumbler gear system and a driven shaft, loose gears on the cone shaft, sliding gears for alternately engaging two members of the cone, means for connecting the sliding gears to the driven shaft, and means for bringing said loose gears into train between the sliding gears and the driven shaft, substantially as described.

4. In a variable speed device, a first shaft and a second shaft, a cone of gears on the first shaft, sliding gears on the second shaft for alternately engaging two members of said cone of gears, a second sliding gear on the second shaft in driven connection with the first named sliding gears, a gear fixed on the second shaft, and a compound gear on the first shaft, and means for throwing said second sliding gear into alternate driving relation with said compound gear and fixed gear, substantially as described.

5. In a variable speed device, a cone and tumbler gear system and a driven shaft, two sets of sliding gears in driving relation with each other, independently slidable, one set of sliding gears alternately engaging two members of the cone, a gear fixed on said driven shaft, adapted to be clutched with one of said sliding gears, substantially as described.

6. In a variable speed device, a cone and tumbler gear system, and a driven shaft, two sets of sliding gears in driving relation with each other, independently slidable, one set of sliding gears alternately engaging two members of the cone, a gear fixed on said driven shaft adapted to be clutched with the second sliding gear, a compound gear on the cone shaft, slidable simultaneous with one of the sliding gears on the driven shaft, whereby an alternate direct and back gear drive may be had between the sliding and fixed gear on the driven shaft, substantially as described.

In testimony whereof, I have hereunto set my hand.

ADOLPH L. DE LEEUW.

Witnesses:
OLIVER B. KAISER,
LEO O'DONNELL.